US010334330B2

(12) United States Patent
Hasani et al.

(10) Patent No.: US 10,334,330 B2
(45) Date of Patent: Jun. 25, 2019

(54) SCALABLE SWITCH

(71) Applicant: Facebook, Inc., Menlo Park, CA (US)

(72) Inventors: Naader Hasani, San Jose, CA (US);
James Williams, Montana, CA (US);
Hans-Juergen Schmidtke, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/668,642

(22) Filed: Aug. 3, 2017

(65) Prior Publication Data
US 2019/0045279 A1 Feb. 7, 2019

(51) Int. Cl.
G02B 6/44 (2006.01)
H04Q 1/16 (2006.01)
H04Q 1/04 (2006.01)

(52) U.S. Cl.
CPC ............. H04Q 1/16 (2013.01); G02B 6/4452 (2013.01); H04Q 1/04 (2013.01)

(58) Field of Classification Search
None
See application file for complete search history.

(56) References Cited

U.S. PATENT DOCUMENTS

| | | | |
|---|---|---|---|
| 6,882,765 B1 * | 4/2005 | Erickson | H04J 14/0227 385/147 |
| 7,996,583 B2 * | 8/2011 | Wilkinson | H04L 12/64 370/360 |
| 8,902,593 B2 * | 12/2014 | Hormuth | H05K 7/1492 361/725 |
| 9,854,697 B2 * | 12/2017 | Schmidtke | H05K 7/20736 |
| 9,904,027 B2 * | 2/2018 | Faw | G02B 6/4452 |
| 2004/0210623 A1 * | 10/2004 | Hydrie | H04L 12/4641 709/201 |
| 2006/0092928 A1 * | 5/2006 | Pike | G06F 13/4022 370/355 |
| 2010/0024001 A1 * | 1/2010 | Campbell | G06F 21/71 726/2 |
| 2010/0195955 A1 * | 8/2010 | Burnham | G02B 6/3897 385/24 |
| 2015/0109076 A1 * | 4/2015 | Lu | H04L 49/00 333/260 |
| 2016/0073542 A1 * | 3/2016 | Huang | H05K 7/1422 361/781 |
| 2016/0335209 A1 * | 11/2016 | Jau | G06F 13/36 |
| 2018/0027700 A1 * | 1/2018 | Adiletta | H05K 7/20736 |
| 2018/0081137 A1 * | 3/2018 | Rivaud | G02B 6/4452 |

* cited by examiner

Primary Examiner — Tina M Wong
(74) Attorney, Agent, or Firm — FisherBroyles, LLP

(57) ABSTRACT

Data center rack systems are described. A data center rack system can include a rack having switches. A removable chassis can include an arrangement of interconnect such that a topology for a switch network can be implemented when the removable chassis is coupled with the switches.

20 Claims, 4 Drawing Sheets

SCALABLE SWITCH

TECHNICAL FIELD

This disclosure relates to a scalable switch using a removable chassis having interconnect to implement a switch network topology among switches of racks for data center configurations.

BACKGROUND

Data centers can include a large number of switches directing data (e.g., formatted within a network packet) among a large number of servers. These switches and servers are often mounted within racks, and the data centers can include hundreds, thousands, or more racks.

The interconnect coupling the switches to each other and, therefore, directing data to the servers can be based on a variety of architectures or topologies. For example, a Clos network includes coupling switches in a multi-stage hierarchy to provide non-blocking functionality such that any input can be provided to any output while reducing the number of ports. A butterfly network includes organizing switches within "ranks" and coupling a switch in one rank with two switches in an adjacent rank. This can result in fewer switches used, but the butterfly network is a blocking network. Thus, different topologies can provide different advantages and disadvantages.

Changing the topology for a group of switches can be a laborious process. For example, a portion of the topology can be defined by a cable coupling ports of switches. To change the topology, cables have to be removed and/or re-arranged among the switches of the racks. This can include thousands of cables depending on the size of the data center and networks.

DETAILED DESCRIPTION

Figure 1A:
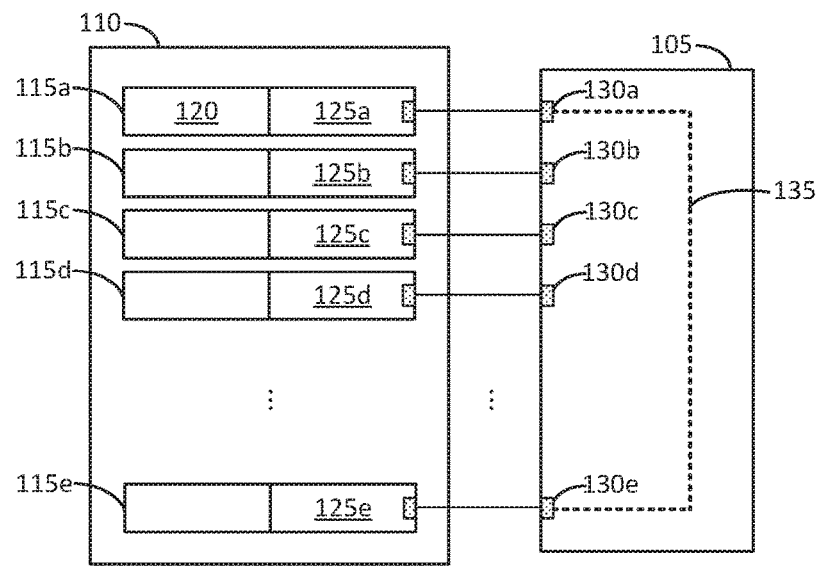
FIG. 1A illustrates an example of a removable chassis providing a topology for a switch rack.

Some of the material described in this disclosure includes systems and techniques for implementing a scalable switch. In one example, a removable chassis can house an arrangement of interconnect (e.g., optical fiber, copper cabling, etc.) coupling its ports. The removable chassis can be coupled (e.g., attached) with a rack housing switches and servers in a data center. The ports of the removable chassis can thus be coupled with ports of the switches and, therefore, the arrangement of the interconnect can define an architecture or topology of a large switch network composed of the individual switches within the rack. The removable chassis can be interchangeable to provide different switch network topologies. For example, one removable chassis can implement a Clos switch network, while another removable chassis can implement a butterfly switch network by having a different arrangement of the interconnect. Switching one removable chassis with another can allow for easy replacement of network topologies without resorting to replacing switches or a large number of cables. Thus, the size and/or topology of switch networks within the data center can be quickly and easily changed.

In more detail, data centers can include racks providing a physical structure (e.g., an enclosure or frame) for mounting devices such as switches, servers, and other networking equipment. A data center can include thousands of racks and, therefore, thousands of switches and servers.

The individual switches within a single rack or among multiple racks can be coupled together with interconnect (e.g., optical fiber, copper wire within cabling, or other types of cables) to implement a larger network of switches, or switch network (or network switch). The arrangement of the interconnect among the individual switches can define a topology or architecture of the larger switch network. For example, a Clos network can include a multi-stage hierarchy of switches that are coupled together in an arrangement that is different than a butterfly network. Other types of switch network topologies can include mesh (e.g., full mesh), tree, and many others. Additionally, the switch networks can be of different sizes. For example, one Clos network might use more switches than another Clos network to provide a larger switch network composed of the individual switches within the racks.

The different topologies allow for different advantages and disadvantages. For example, some switch networks (e.g., Clos networks) are non-blocking such that any input can be provided to any output. Others might not be non-blocking (i.e., some inputs can only be routed to certain outputs), but might provide other advantages such as speed, reduced cost due to using fewer switches, etc.

Sometimes, a switch network can be implemented within a data center based on the current data traffic demands. For example, a topology and size (e.g., an N×M port switch network including an X number of switches) of the switch network can be set up following the construction of the data center. However, as the needs of the data center changes (e.g., due to changes in data traffic), the initial size or type of the topology of a switch network might not be as useful as other sizes and topologies. Thus, the size and/or topology of the switch network should be changed.

However, changing the size or topology of the switch network can be difficult. For example, many of the interconnect (e.g., cables) among the switches defining the topology might have to be removed and/or positioned elsewhere (i.e., couple different ports among different switches). This can include thousands of cables and, therefore, can be a long process. Alternatively, the entire switch network can be replaced, but this can be expensive due to having to purchase new switches arranged in the new topology.

FIG. 1A illustrates an example of a removable chassis providing a topology for a switch rack. A removable chassis 105 in FIG. 1A can be coupled with a rack 110 housing switches 115*a-e* to implement a topology that in turn implements a larger switch network composed of switches 115*a-e*.

For example, in FIG. 1A, switches 115*a-e* each include corresponding network ports 120 and backplane ports 125*a-e*. The network ports 120 can be used for management of the switches or for switches to communicate with servers. By contrast, the backplane ports 125*a-e* of switches 115*a-e* can be coupled together via the removable chassis 105 implementing a topology for a switch network, as discussed above. That is, if switch 115*a* is to provide data to or receive data from switch 115*e* of the rack 110, then the switches 115*a* and 115*e* can have their backplane ports 125*a* and 125*e*, respectively, coupled together via interconnect within the removable chassis 105. Other switches can be coupled together in a similar manner.

For example, the backplane port 125*a* of switch 115*a* can be coupled with port 130*a* of the removable chassis 105. Likewise, each of the backplane ports 125*b-e* of switches 115*b-e*, respectively, can be coupled with the corresponding ports 130*b-e* of the removable chassis 105 as depicted in FIG. 1A. Thus, if switch 115*a* is to be coupled with switch 115*e*, then an interconnect 135 from port 130*a* to port 130*e* of the removable chassis 105 can be made by providing a cable such as an optical fiber or copper cabling attached to ports 130*a* and 130*e*, thereby coupling the backplane port 125*a* with the backplane port 125*e* of switches 115*a* and 115*e*, respectively.

In one example, interconnect 135 might be arranged to couple switches 115*a* and 115*e* because it is implementing a portion of a switch network. That is, as previously discussed, switches 115*a-e* can be coupled together to implement a larger switch, or a switch network. As discussed above, some examples of types of switch networks include Clos networks, mesh or full mesh networks, tree networks, and butterfly networks. However, other topologies of switch networks can be used, and even a combination of topologies (e.g., a combination of a Clos network and a butterfly network, etc.).

Figure 1B:
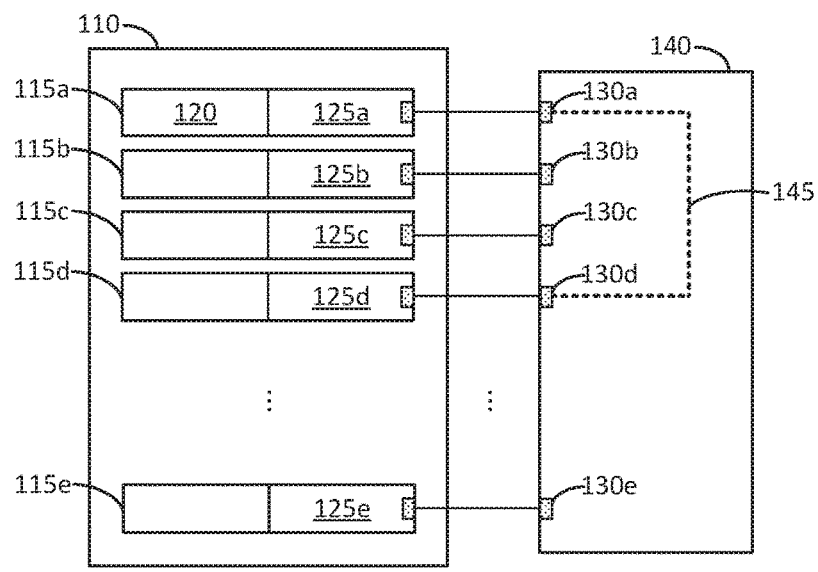
FIG. 1B illustrates an example of another removable chassis providing a different topology for a switch rack.
Figure 2A:
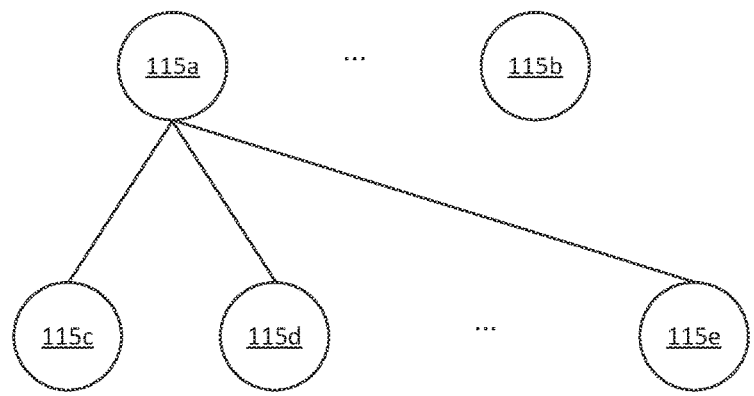
FIGS. 2A and 2B illustrate simplified examples of topologies for switch networks.
Figure 2B:
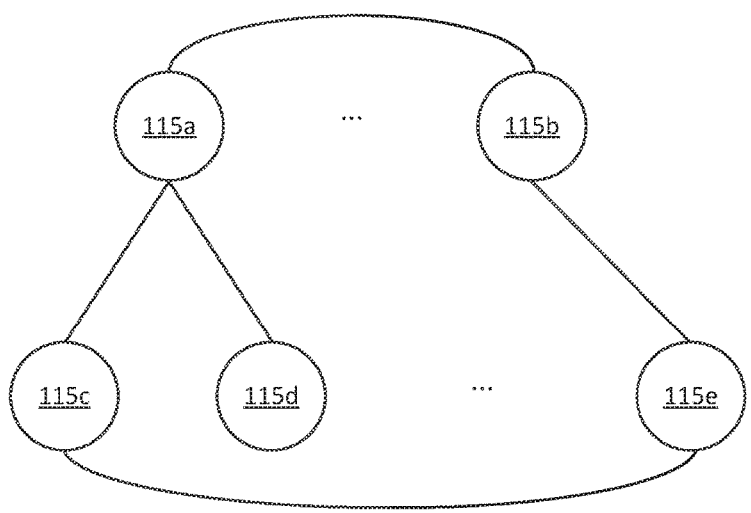

FIG. 1B illustrates an example of another removable chassis providing a different topology for a switch rack. In FIG. 1B, the removable chassis 105 can be replaced with a removable chassis 140 having a different arrangement of interconnect within. For example, rather than having the switch 115*a* coupled with the switch 115*e*, the switch 115*a* can be coupled with switch 115*d* using interconnect 145 coupling ports 130*a* and 130*d*. The other switches 115*b*, 115*c*, and 115*e* can be coupled via interconnect provided by the removable chassis 140 in a similar manner. Thus, because some of the interconnect within the removable chassis 140 couples different switches together than the removable chassis 105, a different switch network can be implemented using the same switches 115*a-e* of the rack 110. For example, in FIG. 1A, the removable chassis 105 can implement a Clos network among the switches 115*a-e* of the rack 110. By contrast, the removable chassis 140 in FIG. 1B can implement a butterfly network among the same switches 115*a-e* of the rack 110. In additional examples, FIGS. 2A and 2B illustrate simplified examples of topologies for switch networks. In FIG. 2A, the switches 115*a-e* can be coupled using interconnect of the removable chassis 105 to implement a topology of a certain switch network. In FIG. 2B, the same switches 115*a-e* can be coupled in a different manner using the interconnect of the removable chassis 140 to implement a different topology of another switch network.

Allowing for interchangeable removable chassis 105 and removable chassis results in the switches 115*a-e* of the rack 110 to be quickly reconfigured into a different switch network topology. Thus, if at one time a Clos network is desirable, then the removable chassis 105 can be placed or coupled with the rack 110 such that the backplane pots 125*a-e* of the switches 115*a-e* are coupled with the ports 130*a-e* of the removable chassis 105. At another time, if a butterfly network is desirable, then the removable chassis 105 can be removed (e.g., detached or decoupled from the rack 110) and replaced with the removable chassis 140. Thus, the interconnect among the switches 115*a-e* can be easily replaced by swapping a single removable chassis rather than having to individually unplug each interconnect and rearrange the interconnect to implement the desired topology of the switch network. Moreover, this results in a decoupling of a physical topology (e.g., the switches organized in racks) from the network topology (e.g., how the switches organized within the racks are coupled together). Thus, an M number of removable chassis can be used with an N number of racks (e.g., M and N being different or even the same).

Figure 3:
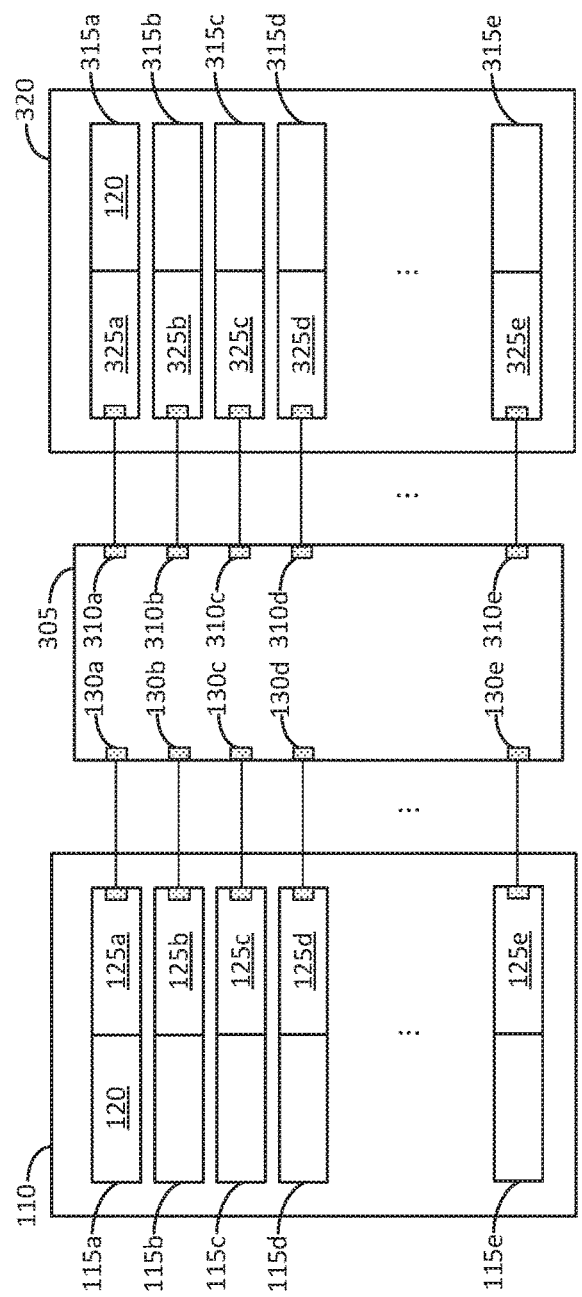
FIG. 3 illustrates an example of a removable chassis providing a topology using multiple switch racks.

Sometimes, the number of switches within a rack can be fewer than the number desired for a switch network of larger sizes. FIG. 3 illustrates an example of a removable chassis providing a topology using multiple switch racks. In FIG. 3, the removable chassis 305 includes additional ports 310*a-e* that are coupled with the backplane ports 325*a-e* of the switches 315*a-e* of the rack 320. Using the removable chassis 305 in FIG. 3, a switch network can be implemented using switches from both racks 110 and 320. Because more racks can be coupled together via the interconnect of the removable chassis 305, a larger switch network can be implemented. Removable chassis can be replaced with another removable chassis to change the topology in a manner similar to the other examples described herein. Thus, larger Clos networks, mesh networks, tree networks, butterfly networks, etc. can be easily and quickly implemented by using removable chassis 305.

Figure 4:
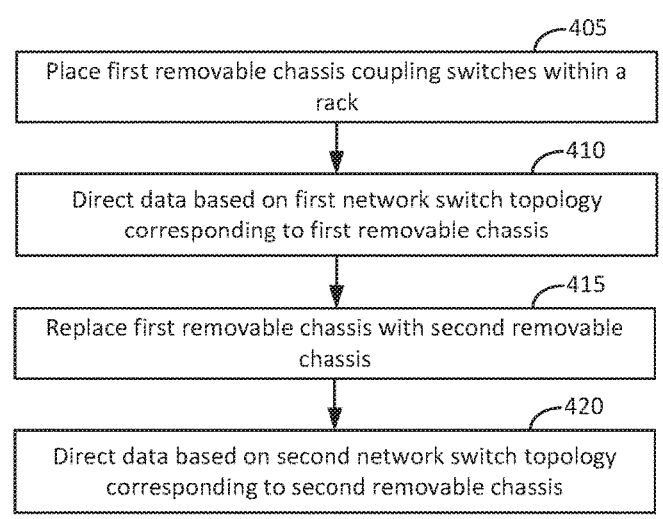
FIG. 4 illustrates a block diagram of using a removable chassis for providing a topology for a switch network using switches within a rack.

FIG. 4 illustrates a block diagram of using a removable chassis for providing a topology for a switch network using switches within a rack. Switches can be mounted within racks and coupled together to implement a larger switch network, as previously discussed. How each switch is coupled to one or more other switches can define a topology of that switch network. In FIG. 4, a first removable chassis can be placed to couple switches within a rack (405). For example, in FIG. 1A, the removable chassis 105 can be placed, inserted, arranged, coupled, set up, etc. such that its ports 130*a-e* are coupled with the backplane ports 125*a-e* of the switches 115*a-e* of the rack 110. The arrangement of the interconnect within the removable chassis 105 can implement one type of topology for a switch network including the switches 115*a-e* (e.g., a Clos network). Thus, data can be directed among the switches 115*a-e* to various servers or other networking equipment based on the topology of the switch network (410). Later, the topology of the switch network using the switches 115*a-e* might be changed to account for changes in data traffic within the data center. Thus, the first removable chassis can be replaced with a second removable chassis (415). For example, in FIG. 1B, the removable chassis 105 can be replaced with the removable chassis 140. The arrangement of interconnect within the removable chassis 140 can be different than the removable chassis 105 and, therefore, a different switch network topology using the same physical collection of the switches 115*a-e* of the rack 110 can be implemented. As a result, data can be directed based on a second switch network topology implemented using the second removable chassis (420).

Many of the examples herein discuss switching a topology (e.g., the type of topology from a Clos network to a butterfly network). However, as previously discussed, a same or similar topology can be maintained, but the size of the topology of the switch network can be changed. For example, by replacing a removable chassis, a switch network can be made larger or smaller (e.g., use an increased or reduced number of switches, respectively) based on how the interconnects are arranged. Thus, a removable chassis can implement all or part of a Clos network of one size, and that removable chassis can be replaced with another implementing all or part of another Clos network of a larger size using more switches. In some implementations, a large switch network can be implemented with multiple removable chassis placed among several racks at the same time.

From the foregoing, it will be appreciated that specific embodiments of the invention have been described herein for purposes of illustration, but that various modifications may be made without deviating from the scope of the invention. Accordingly, the invention is not limited except as by the appended claims.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one implementation," "an implementation," "one embodiment," or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A data center rack system, comprising:
a network rack housing a first switch having a port and a second switch having a port;
a first removable chassis having a first port and a second port, the first removable chassis including a first arrangement of interconnect coupling the first port with the second port, the first port of the first removable chassis coupled with the port of the first switch, and the second port of the first removable chassis coupled with the port of the second switch implementing a portion of a first topology of a first switch network, wherein:
the first removable chassis is configured to be interchangeable with a second removable chassis implementing a portion of a second topology of a second switch network, the first topology and the second topology being different types of topologies, such that replacing the first removable chassis with the second removable chassis replaces the first topology of the first switch network with the second topology of the second switch network;
a type of the first topology is one of a Clos network, a butterfly network, a mesh network, or a tree network; and
a type of the second topology is a different one of a Clos network, a butterfly network, a mesh network, or a tree network.

2. The data center rack system of claim 1, wherein the network rack is disposed in a data center.

3. The data center rack system of claim 1 wherein the network rack houses a third switch having a port and a fourth switch having a port, and wherein the port of the first switch is coupled with the port of the third switch, and the port of the second switch is coupled with the port of the fourth switch in the second topology of the second switch network.

4. The data center rack system of claim 1, wherein replacing the first removable chassis with the second removable chassis enables easy replacement of network topologies without resorting to replacing individual switches or individual cables.

5. The data center rack system of claim 1, wherein the interconnect includes optical fiber.

6. The data center rack system of claim 1, wherein the interconnect includes copper cabling.

7. The data center rack system of claim 1, wherein:
the first topology is non-blocking such that any input can be provided to any output; and
the second topology is blocking such that some inputs can only be routed to certain outputs.

8. A system, comprising:
a first rack including a first set of switches;
a second rack including a second set of switches; and
a first chassis having a first arrangement of interconnect coupled with the first set of switches and the second set of switches to implement a first topology of a first switch network, wherein the first chassis is configured to be interchangeable with a second chassis having a second arrangement of interconnect and when coupled with the first set of switches and the second set of switches implements a second topology of a second switch network using the first set of switches and the second set of switches, the first arrangement of interconnect being different than the second arrangement of interconnect, wherein:
  a type of the first topology is one of a Clos network, a butterfly network, a mesh network, or a tree network; and
  a type of the second topology is a different one of a Clos network, a butterfly network, a mesh network, or a tree network.

9. The system of claim 8, wherein the first rack and the second rack are disposed in a data center.

10. The system of claim 8, wherein replacing the first removable chassis with the second removable chassis enables easy replacement of network topologies without resorting to replacing individual switches or individual cables.

11. The system of claim 8, wherein the first topology and the second topology are similar topologies having different sizes.

12. The system of claim 8, wherein the first topology is implemented with a first number of switches, the second topology is implemented with a second number of switches, the first number and the second number being different.

13. The system of claim 8, wherein the interconnect includes optical fiber.

14. The system of claim 8, wherein the interconnect includes copper cabling.

15. A method, comprising:
  placing in a rack a first removable chassis that implements a portion of a first topology of a first switch network and that is configured to couple switches within the rack in the first topology, wherein the first removable chassis is configured to be interchangeable with a second removable chassis implementing a portion of a second topology of a second switch network, the first topology and the second topology being different types of topologies, such that replacing the first removable chassis with the second removable chassis replaces the first topology of the first switch network with the second topology of the second switch network, a type of the first topology is one of a Clos network, a butterfly network, a mesh network, or a tree network, and a type of the second topology is a different one of a Clos network, a butterfly network, a mesh network, or a tree network;
  directing data among the switches within the rack based on the first topology;
  replacing the first removable chassis with the second removable chassis configured to couple the switches within the rack in the second topology; and
  directing data among the switches within the rack based on the second topology.

16. The method of claim 15, wherein the rack is disposed in a data center.

17. The method of claim 15, wherein the first removable chassis has a first arrangement of interconnect, the second removable chassis has a second arrangement of interconnect, the first arrangement and the second arrangement being different.

18. The method of claim 17, wherein the interconnect in the first arrangement and the second arrangement are optical fibers.

19. The method of claim 15, wherein replacing the first removable chassis with the second removable chassis enables easy replacement of network topologies without resorting to replacing individual switches or individual cables.

20. The method of claim 15, wherein:
  the first topology is non-blocking such that any input can be provided to any output; and
  the second topology is blocking such that some inputs can only be routed to certain outputs.

* * * * *